Oct. 23, 1962

J. R. WALKER 3,059,758

CONVEYOR BELTS

Filed Aug. 29, 1960

2 Sheets-Sheet 1

Inventor
John R. Walker
By Stevens Davis Miller & Mosher
Attorneys 3,059,758
CONVEYOR BELTS
John R. Walker, Inverness, Scotland, assignor to Cable Belt Limited, Inverness, Scotland
Filed Aug. 29, 1960, Ser. No. 52,574
Claims priority, application Great Britain Oct. 14, 1959
1 Claim. (Cl. 198—201)

This invention relates to conveyor belts for use in belt conveyors of the rope-driven type in which the belt is supported at its edges on, and driven by ropes which are themselves supported on pulleys.

It has been proposed to provide such conveyor belts with stiff transversely extending resilient members such as metal bars or rods to control the troughing of the belt under load, and longitudinal strength is usually provided by one or more layers of woven fabric, the resilient members and woven fabric being enclosed in an envelope of rubber or other elastomeric material which may be of increased thickness at the edges of the belt to accommodate grooves in which the driving and supporting ropes are engaged.

It is the object of the present invention to provide an improved conveyor belt having the features set forth in the last preceding paragraph.

According to the invention, in a conveyor belt for a conveyor of the type set forth, a core comprising spaced resilient metal reinforcing members extending transversely of the belt and having the spaces between them filled with elastomeric material is completely surrounded by at least one layer of woven sheet material extending around its top and bottom faces and its edges, the said woven sheet material being wholly enclosed in an envelope of elastomeric material and the whole being bonded together by the application of heat and pressure.

Figure 1:
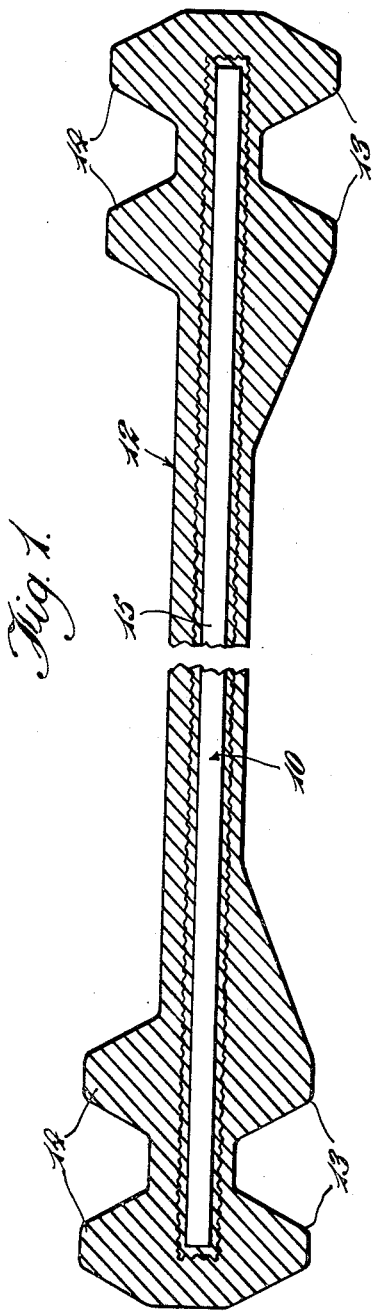
Figure 2:
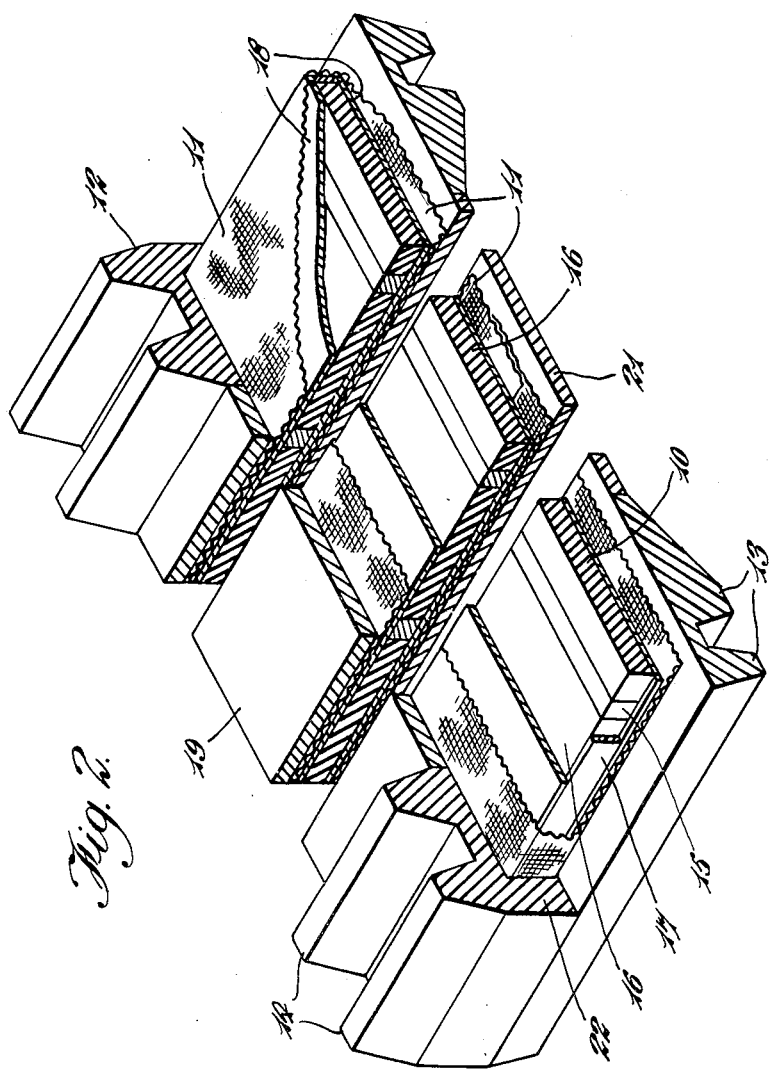

The invention is hereinafter described with reference to the accompanying drawings, in which:

FIGURE 1 is a cross-section of a conveyor belt according to the invention, the middle portion of the belt being broken away; and FIGURE 2 is a perspective view of the belt shown in FIGURE 1, showing the parts from which it is formed assembled ready for bonding together, some parts being broken away to show the internal construction.

Referring to the drawings, the belt comprises a core 10 including transverse reinforcing members of resilient metal, a wrapping 11 of woven sheet material completely enclosing the core 10, and an external envelope 12 of elastomeric material completely enclosing the wrapping 11. The envelope 12 includes grooved strips 13, 14 extending along the edges of the belt on both faces thereof, the grooves being adapted to receive cables on which the belt is supported when in use. The belt is formed of a number of parts including strips and sheets of suitably compounded rubber which are assembled together with the rubber compounds in an un-cured state, the whole then being subjected to heat and pressure to cure the rubber compounds and bond the parts together.

The reinforcing members are shown in the drawing as metal bars 15 of square cross-section, and are formed of spring steel. They may, however, consist of rods, bars or straps of any cross-sectional shape, the term "rods" being intended to include composite rods formed by twisting together a plurality of thinner rod-like elements. The reinforcing members may be twisted, apertured or otherwise formed to provide a key for the enveloping material. In assembling the belt, strips 16 of a rubber compound are placed between each two adjacent bars 15, the strips 16 having the same length and thickness as the bars and having a width equal to the desired spacing of the bars. Further strips 17 of the same rubber compound are laid along the edges of the assembly of bars 15 and strips 16, and thin sheets 18 of the said compound are placed on each side of the said assembly. The core assembly so formed is then wrapped in a strip of woven fabric having a width sufficient to extend right round the faces and edges of the said core assembly and overlap to some extent at the centre of one face, thus forming the wrapping 11, the woven fabric being impregnated with a rubber compound capable of uniting with the compound used to form the strips 16 and 17 and the sheets 18.

The envelope 12 comprises two flat strips 19 and 21 covering the central portions of the two faces of the belt, and the grooved strips 13 and 14 above referred to, the strips 14 being formed with ribs 22 to cover the edges of the belt. The rubber compound forming the parts of the envelope is selected to have good wear-resisting qualities, and is capable of uniting with the compounds used in other parts of the belt.

The rubber compound used in the core of the belt may have less strength and wear resistance than that used in the envelope, the core compound, for example containing substantial quantities of non-reinforcing fillers, since it is not required to contribute materially to the strength and impact resistance of the belt.

It will be understood that elastomers other than rubber may be used in the fabrication of the belt, including materials such as polyvinyl chloride, and that the woven fabric may be of textile material or filaments of thermoplastic material.

The complete enclosure of the core of the belt in a wrapping of woven material improves the distribution of the load to the resilient bars, and prevents the bars from breaking through the edges of the belt.

The construction according to the present invention also facilitates the manufacture of the belt, since the fabric wrapping prevents the metal bars from floating out of position when the elastomer is liquid during curing.

I claim:

A conveyor belt for a conveyor of the type set forth comprising a core including spaced resilient metal reinforcing members extending transversely of the belt, elastomeric material filling the spacers between said members, an envelope comprising at least one layer of woven sheet material completely surrounding the core and extending around its top and bottom faces and its side edges, and an envelope of elastomeric material wholly enclosing said woven sheet material, the whole being bonded together and cured by the application of heat and pressure, the elastomeric material being of a type which is liquid during curing, the envelope of woven sheet material enclosing the ends of the metal reinforcing members and preventing the metal reinforcing members from floating out of position while the elastomeric material is liquid during curing, said woven sheet material also preventing said reinforcing members from subsequently breaking through the side edges of the belt after the elastomeric material has been cured and the belt has been placed in operation and flexes and unflexes under load.

References Cited in the file of this patent
UNITED STATES PATENTS

| 2,593,284 | Ewell | Apr. 15, 1952 |
| 2,656,035 | Thomson et al. | Oct. 20, 1953 |
| 2,732,930 | Thomson | Jan. 31, 1956 |